US011975958B2

(12) United States Patent
Tsai et al.

(10) Patent No.: US 11,975,958 B2
(45) Date of Patent: May 7, 2024

(54) AUTOMATIC FLUID REPLACEMENT DEVICE AND FLUID CONVEY JOINT

(71) Applicant: INDUSTRIAL TECHNOLOGY RESEARCH INSTITUTE, Hsinchu (TW)

(72) Inventors: Cheng-Han Tsai, Hsinchu (TW); Wei-Lung Pan, Hsinchu (TW); Chih-Ta Wu, Taipei (TW); I-hsin Lin, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/975,520

(22) Filed: Oct. 27, 2022

(65) Prior Publication Data
US 2024/0067512 A1 Feb. 29, 2024

(30) Foreign Application Priority Data

Aug. 31, 2022 (TW) .................................. 111132836

(51) Int. Cl.
*B67C 3/34* (2006.01)
*B05C 11/10* (2006.01)

(52) U.S. Cl.
CPC ................. *B67C 3/34* (2013.01); *B05C 11/10* (2013.01)

(58) Field of Classification Search
CPC .............. B67C 3/30; B67C 3/34; B05C 11/10
See application file for complete search history.

(56) References Cited

U.S. PATENT DOCUMENTS

| 4,211,263 | A | * | 7/1980 | Kennedy | ................ | G01G 13/04 |
| | | | | | | 177/122 |
| 4,337,802 | A | * | 7/1982 | Kennedy | ................... | B67C 3/30 |
| | | | | | | 141/93 |
| 4,630,654 | A | * | 12/1986 | Kennedy, Jr. | ............. | B65B 3/28 |
| | | | | | | 141/192 |

(Continued)

FOREIGN PATENT DOCUMENTS

CN 101837939 A 9/2010
CN 206666110 U 11/2017
(Continued)

OTHER PUBLICATIONS

Machine Translation of CN101837939, Sep. 2010, all pages (Year: 2010).*

(Continued)

*Primary Examiner* — Nicolas A Arnett
(74) *Attorney, Agent, or Firm* — Maschoff Brennan (57) ABSTRACT

An automatic fluid replacement device is adapted to be mounted on an opening of a storage barrel. The automatic fluid replacement device includes a robotic arm, at least one fluid convey joint and a controller. The robotic arm has a gripper. The fluid convey joint includes a convey pipe, a sleeve and a sealing bag. The convey pipe is configured to deliver a fluid. The sleeve is sleeved on the convey pipe. The gripper clamps the sleeve. The sealing bag is sleeved on the sleeve. The controller is configured for automatically controlling the robotic arm to move the fluid convey joint into the opening and controlling the sealing bag to be inflated to seal the opening.

11 Claims, 6 Drawing Sheets

(56) References Cited

U.S. PATENT DOCUMENTS

| | | | | |
|---|---|---|---|---|
| 4,825,913 | A * | 5/1989 | Stott | B65B 39/04 |
| | | | | 141/93 |
| 4,932,445 | A * | 6/1990 | Biehl | B67C 3/30 |
| | | | | 141/93 |
| 5,144,992 | A * | 9/1992 | Jaerger | B65D 90/587 |
| | | | | 141/93 |
| 5,213,140 | A * | 5/1993 | Miscevic | C01B 25/003 |
| | | | | 141/82 |
| 5,484,004 | A * | 1/1996 | Bolz | B67C 3/34 |
| | | | | 414/217 |
| 6,053,219 | A * | 4/2000 | Seiver | G01G 17/06 |
| | | | | 141/83 |
| 6,158,195 | A * | 12/2000 | Andersson | B65B 3/326 |
| | | | | 53/237 |
| 6,167,682 | B1 * | 1/2001 | Moon | B65B 7/285 |
| | | | | 53/488 |
| 6,543,494 | B2 * | 4/2003 | Bellin | B67C 3/30 |
| | | | | 141/192 |
| 6,725,890 | B1 * | 4/2004 | Green | B65B 3/28 |
| | | | | 141/168 |
| 7,168,460 | B2 * | 1/2007 | Dietrich | B65B 1/16 |
| | | | | 414/217 |
| 8,342,209 | B2 * | 1/2013 | Hasunuma | F16L 37/36 |
| | | | | 138/90 |
| 10,197,194 | B2 * | 2/2019 | Haynes | F16L 55/035 |
| 10,435,287 | B2 * | 10/2019 | Lu | B67B 7/182 |
| 10,442,674 | B2 * | 10/2019 | Tuohey | C12M 23/14 |
| 10,807,744 | B1 * | 10/2020 | Seiver | B67B 3/2013 |
| 11,136,150 | B1 * | 10/2021 | Seiver | B67B 3/204 |
| 11,713,231 | B2 * | 8/2023 | Imai | B25J 13/08 |
| | | | | 141/159 |
| 11,738,982 | B2 * | 8/2023 | Imai | F16J 13/24 |
| | | | | 439/271 |
| 2016/0039659 | A1 * | 2/2016 | Ware | B67D 7/763 |
| | | | | 222/61 |
| 2018/0257925 | A1 * | 9/2018 | Schultz | G01N 33/2858 |
| 2020/0376419 | A1 * | 12/2020 | Tanaka | B01D 29/56 |
| 2022/0380190 | A1 * | 12/2022 | Imai | B67D 7/0288 |

FOREIGN PATENT DOCUMENTS

| | | |
|---|---|---|
| CN | 107720684 A | 2/2018 |
| CN | 108840304 A | 11/2018 |
| CN | 110715137 A | 1/2020 |
| CN | 110740970 A | 1/2020 |
| CN | 111333014 A | 6/2020 |
| CN | 214653603 U | 11/2021 |
| CN | 214932707 U | 11/2021 |
| TW | I687618 B | 3/2020 |
| TW | 202043179 A | 12/2020 |

OTHER PUBLICATIONS

TW Office Action dated Aug. 14, 2023 as received in Application No. 111132836.

* cited by examiner

AUTOMATIC FLUID REPLACEMENT DEVICE AND FLUID CONVEY JOINT

CROSS-REFERENCE TO RELATED APPLICATIONS

This non-provisional application claims priority under 35 U.S.C. § 119(a) on Patent Application No(s). 111132836 filed in Taiwan, R.O.C. on Aug. 31, 2022, the entire contents of which are hereby incorporated by reference.

TECHNICAL FIELD

The disclosure relates to a fluid replacement device and a fluid convey joint, more particularly to an automatic fluid replacement device and a fluid convey joint having a sealing bag.

BACKGROUND

The semiconductor industry has achieved a rapid increase of the arrangement density of electronic components which resulting from the constant reduction in component size. Ultimately, much smaller components are integrated into a given area. These improvements are mainly due to the development of new precision and high-resolution processing techniques.

During the manufacture of high-density integrated circuits, various treatment liquids are required. These treatment liquids are generally stored in chemical barrels, and the treatment liquids in the chemical barrels are replaced by a liquid replacement equipment as required. When it is necessary to replace the processing liquid in the chemical barrel, the liquid extraction joint of the liquid replacement equipment will be installed at an opening of the chemical barrel so as to replace the liquid in the chemical barrel. In order to prevent the leakage of the gas formed by the volatilization of the liquid in the chemical barrel during the replacement of the liquid, a liquid extraction joint that matches the diameter of the opening of the chemical barrel is generally selected to seal the opening and prevent the leakage of volatile gas.

SUMMARY

The disclosure provides an automatic fluid replacement device and a fluid convey joint which is capable of matching different sizes of openings of storage barrels.

One embodiment of the disclosure provides an automatic fluid replacement device. The automatic fluid replacement device is adapted to be mounted on an opening of a storage barrel. The automatic fluid replacement device includes a robotic arm, at least one fluid convey joint and a controller. The robotic arm has a gripper. The fluid convey joint includes a convey pipe, a sleeve and a sealing bag. The convey pipe is configured to deliver a fluid. The sleeve is sleeved on the convey pipe. The gripper clamps the sleeve. The sealing bag is sleeved on the sleeve. The controller is configured for automatically controlling the robotic arm to move the fluid convey joint into the opening and controlling the sealing bag to be inflated to seal the opening.

Another embodiment of the disclosure provides a fluid convey joint. The fluid convey joint is adapted to be mounted at an opening of a storage barrel. The fluid convey joint includes a convey pipe, a sleeve, a sealing bag and a first pressure sensor. The convey pipe is configured to deliver a fluid. The sleeve is sleeved on the convey pipe. The sealing bag is sleeved on the sleeve. The first pressure sensor is configured to measure an air pressure inside the sealing bag.

Note that the automatic fluid replacement device and the fluid convey joint is adapted for a fluid, such as a liquid, a gas or the mixture thereof.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
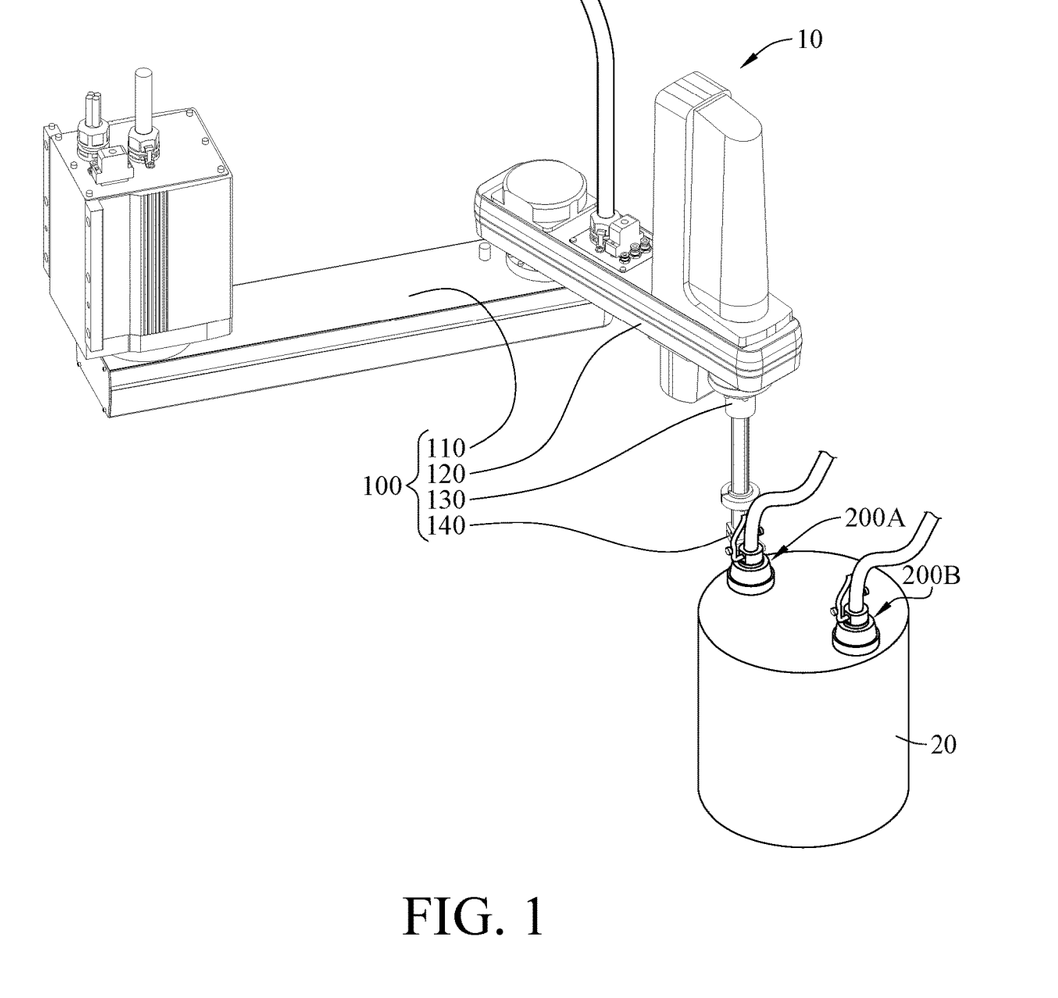
FIG. 1 is a perspective view of an automatic fluid replacement device according to a first embodiment of the disclosure and a storage barrel.
Figure 2:
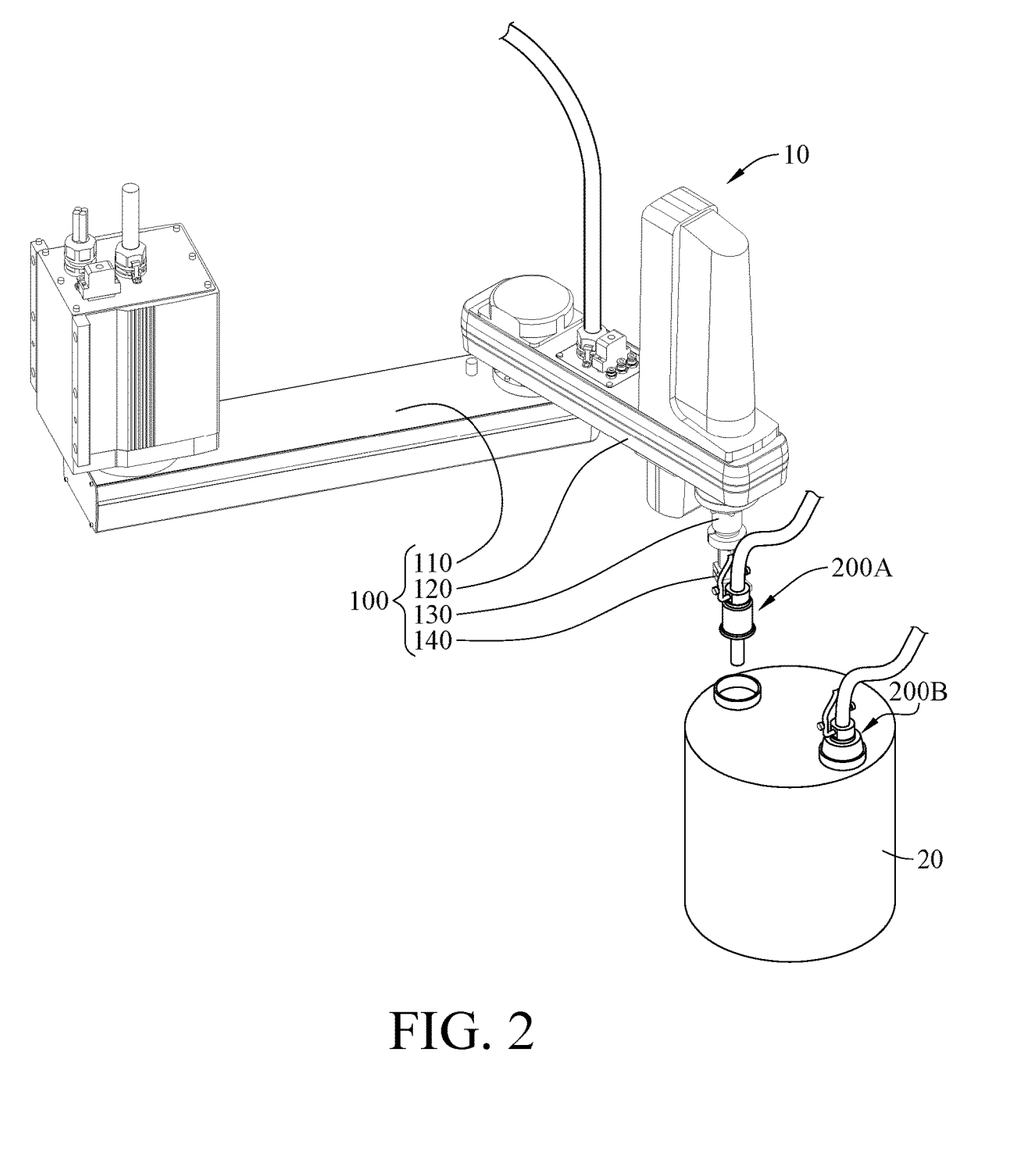
FIG. 2 shows one of fluid convey joints of the automatic fluid replacement device is separated from the storage barrel in FIG. 1.

Refer to FIGS. 1 to 2, where FIG. 1 is a perspective view of an automatic fluid replacement device 10 according to a first embodiment of the disclosure and a storage barrel 20, and FIG. 2 shows a fluid convey joint 200A of the automatic fluid replacement device 10 is separated from the storage barrel 20 in FIG. 1.

Figure 3:
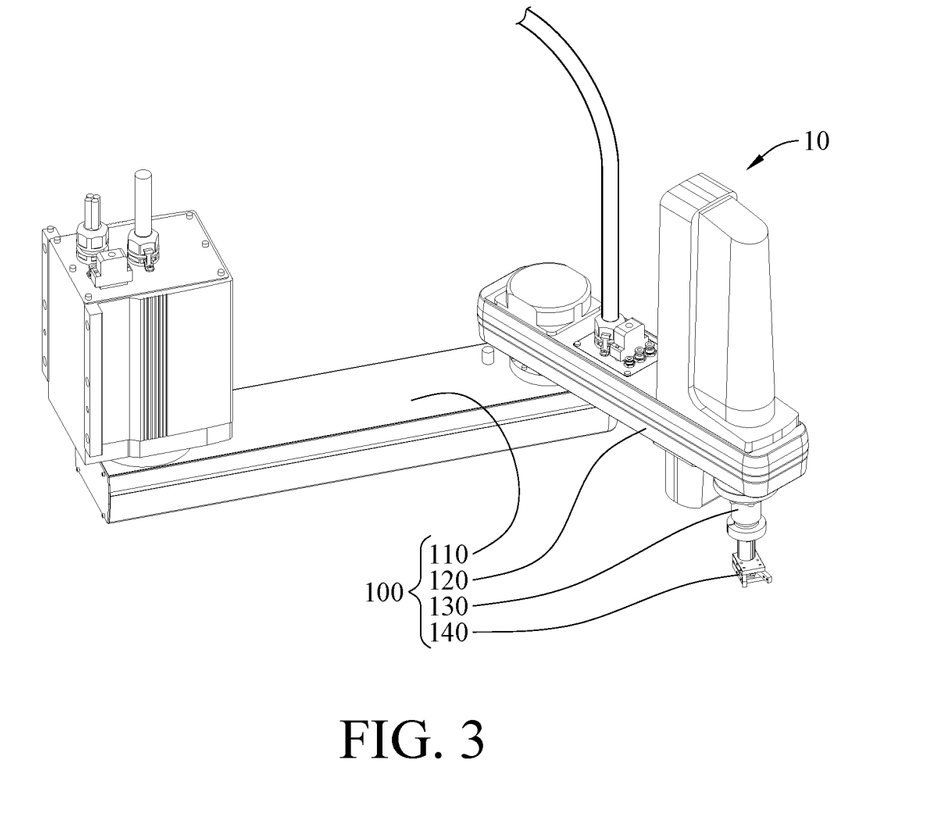
FIG. 3 is a perspective view of a robotic arm of the automatic fluid replacement device in FIG. 1.
Figure 4:
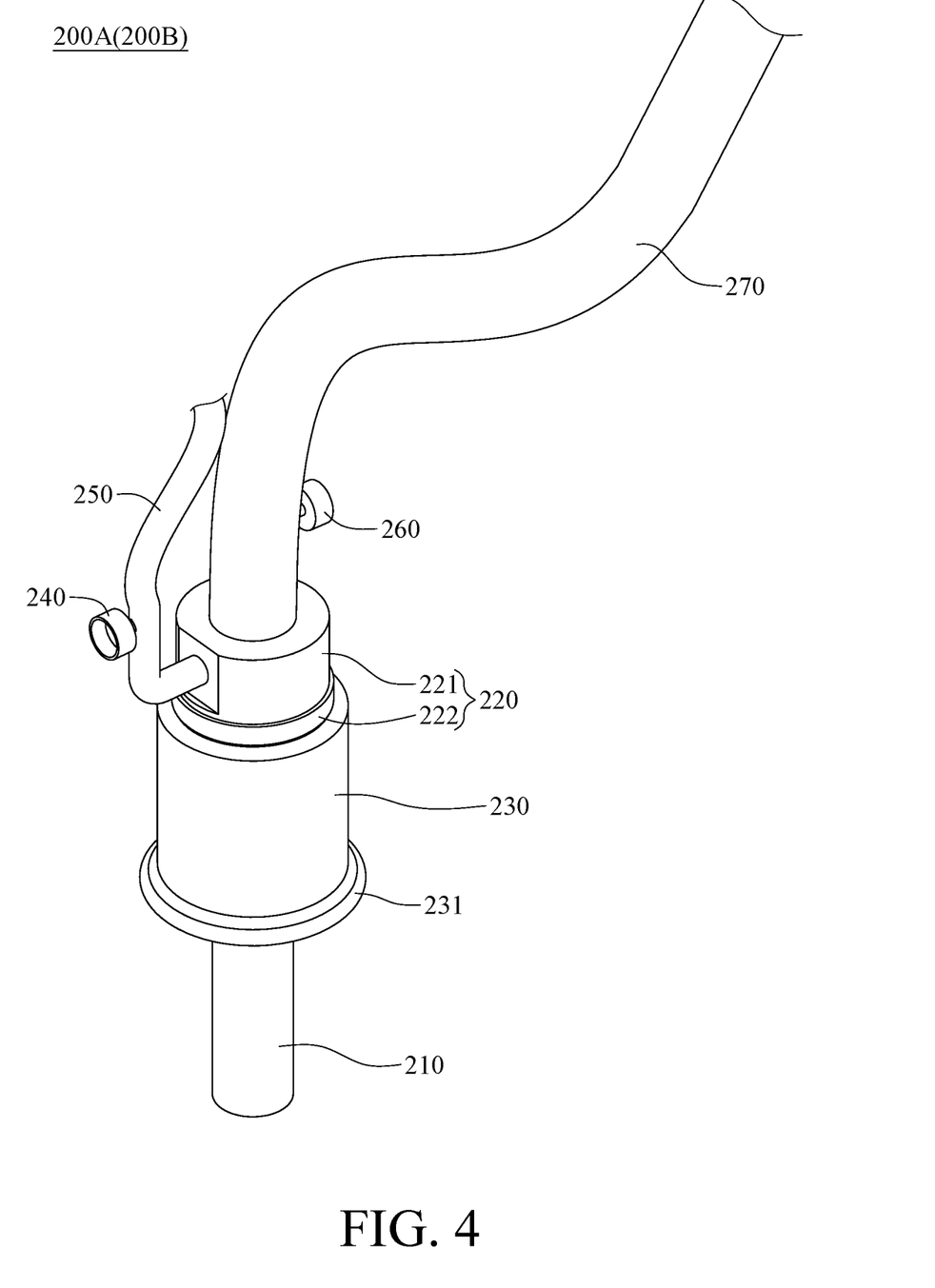
FIG. 4 is a perspective view of the fluid convey joints of the automatic fluid replacement device in FIG. 1.
Figure 5:
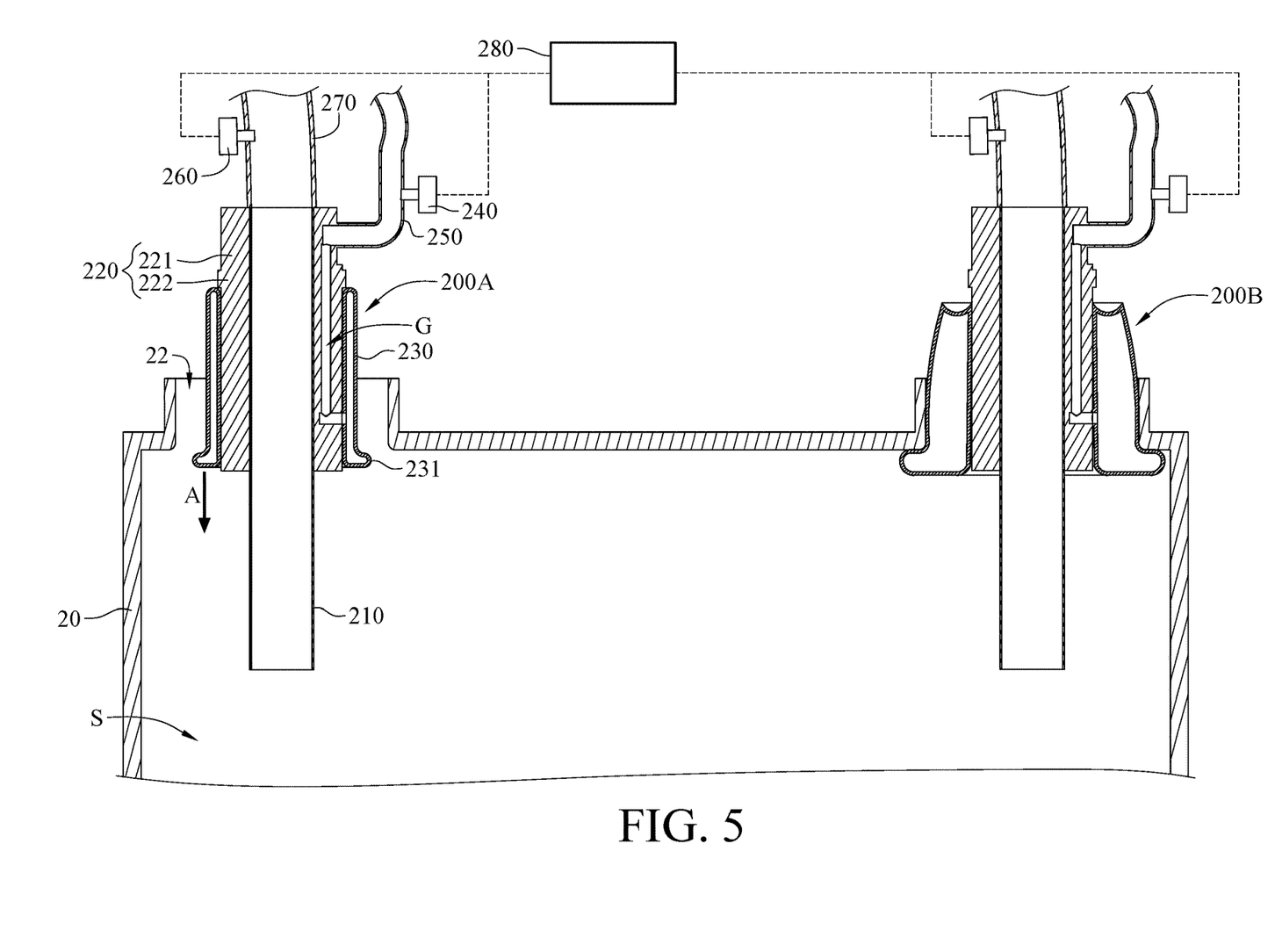
FIG. 5 is a cross-sectional view of the automatic fluid replacement device and the storage barrel in FIG. 1 when the fluid convey joint is placed in an opening of the storage barrel.

Refer to FIGS. 3 to 5, where FIG. 3 is a perspective view of a robotic arm 100 of the automatic fluid replacement device 10 in FIG. 1, FIG. 4 is a perspective view of fluid convey joint 200A or 200B of the automatic fluid replacement device 10 in FIG. 1, and FIG. 5 is a cross-sectional view of the automatic fluid replacement device 10 and the storage barrel 20 in FIG. 1 when the fluid convey joint 200A is placed in an opening 22 of the storage barrel 20.

In this embodiment, the automatic fluid replacement device 10 is adapted to be mounted into at least one opening 22 of the storage barrel 20. The storage barrel 20 is, for example, configured to storage a chemical liquid or volatile gas. The storage barrel 20 has a storage space S and two openings 22. The automatic fluid replacement device 10 is configured to extract liquid or gas out of the storage barrel 20 or filling liquid or gas into the storage barrel 20. The automatic fluid replacement device 10 includes a robotic arm 100, two fluid convey joints 200A and 200B and a controller 280.

As shown in FIG. 3, the robotic arm 100, for example, includes a first arm 110, a second arm 120, a third arm 130 and a gripper 140. The second arm 120 is movably disposed on the first arm 110. The third arm 130 is movably disposed on the second arm 120. The gripper 140 is disposed on the third arm 130, and the gripper 140 is movable in at least three axes via the movements of the first arm 110, the second arm 120 and the third arm 130; that is, the gripper140 has a freedom of the movement in the three-axis direction of a three-dimensional space.

Figure 6:
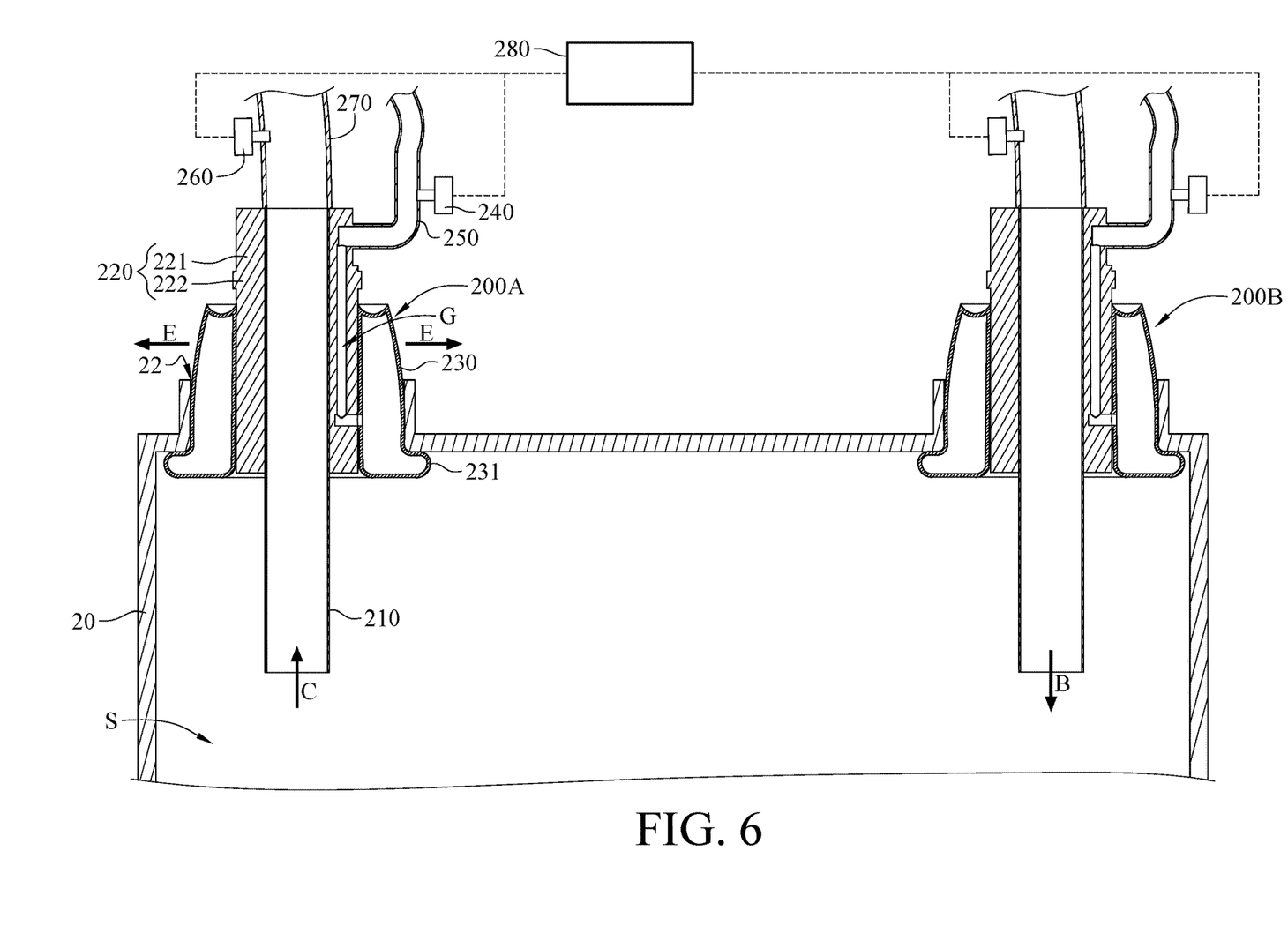
FIG. 6 is a cross-sectional view of the automatic fluid replacement device and the storage barrel in FIG. 5 when a sealing bag of the fluid convey joint is inflated.

Referring to FIG. 4, the fluid convey joints 200A and 200B are the same or similar in structure, and thus the following merely introduces the structure of the fluid convey joint 200A. The fluid convey joint 200A includes a convey pipe 210, a sleeve 220 and a sealing bag 230. The convey pipe 210 is configured to deliver a fluid. The sleeve 220 is sleeved on the convey pipe 210. The sleeve 220 includes a clamped portion 221 and a mount portion 222 connected to each other. The sealing bag 230 is sleeved on the mount portion 222 of the sleeve 220, and the clamped portion 221 is exposed to the outside. The gripper 140 of the robotic arm 100, for example, clamps the clamped portion 221 of the sleeve 220 and thus can move the fluid convey joint 200A. The sealing bag 230 has a flange structure 231. As shown in FIGS. 5 and 6, when the opening 22 is sealed by the sealing bag 230, the flange structure 231 is engaged with an inner surface of the storage barrel 20, such that the flange structure 231 helps the fluid convey joint 200A to resist an inner pressure of the storage barrel 20.

In this embodiment, there are two fluid convey joints 200A and 200B, one of them is for filling the gas into the storage barrel 20, and the other is for extracting the chemical liquid out of the storage barrel 20. However, the quantity of the fluid convey joints 200A and 200B is not restricted in the disclosure and may be modified to be one in some other embodiments.

The controller 280 is configured for automatically controlling the robotic arm 100 to move the fluid convey joints 200A and 200B into the openings 22 and controlling the sealing bags 230 of the fluid convey joints 200A and 200B to be inflated to seal the openings 22. In contrast, the controller 280 can control the sealing bags 230 of the fluid convey joints 200A and 200B to be deflated and control the robotic arm 100 to remove the fluid convey joints 200A and 200B from the openings 22.

In this embodiment, the fluid convey joint 200A may further include a first pressure sensor 240, and the first pressure sensor 240 is configured to measure an air pressure inside the sealing bag 230. The controller 280 is configured to control an air inflation amount of the sealing bag 230 according to the air pressure inside the sealing bag 230.

In this embodiment, the fluid convey joint 200A may further include an inflation pipe 250. The sleeve 220 has an inflation channel G. The inflation channel G is in fluid communication with the sealing bag 230. One end of the inflation pipe 250 is connected to an external inflator (not shown), and another end of the inflation pipe 250 is connected to the sleeve 220 and in fluid communication with the sealing bag 230 through the inflation channel G. As a result, the external inflator can inflate or deflate the sealing bag 230 through the inflation pipe 250 and the inflation channel G. The first pressure sensor 240 is disposed on the inflation pipe 250 for measuring the air pressure inside the sealing bag 230. Since the sealing bag 230 can be inflated or deflated to adjust an outer diameter of the fluid convey joint 200A, the inflatable sealing bag 230 enables the fluid convey joint 200A to fit different sizes of the opening 22. In addition, the sealing bag 230 is elastically deformable, such that the fluid convey joint 200A can be installed on the storage barrel 20 with different angles. For example, an axis of the convey pipe 210 of fluid convey joint 200A may be perpendicular or at an acute angle to a plane where the opening 22 is located.

In this embodiment, the fluid convey joint 200A may further include a second pressure sensor 260. The second pressure sensor 260 is configured to measure an air pressure inside the storage barrel 20. The controller 280 is configured to control the air inflation amount of the sealing bag 230 according to the air pressure inside the storage barrel 20 and the air pressure inside the sealing bag 230.

In this embodiment, the fluid convey joint 200A may further include a fluid pipe 270. One end of the fluid pipe 270 is connected to an external gas inflation device (not shown) or an external liquid extraction device (not shown), and another end of the fluid pipe 270 is connected to the sleeve 220 and in fluid communication with the convey pipe 210. As a result, the external gas inflation device can fill gas (e.g., nitrogen) into the storage barrel 20 through the fluid pipe 270 and the convey pipe 210, or the external liquid extraction device can extract the chemical liquid out of the storage barrel 20 through the fluid pipe 270 and the convey pipe 210. The second pressure sensor 260 is disposed on the fluid pipe 270.

In this embodiment, the sealing bag 230 has the flange structure 231, but the disclosure is not limited thereto; in some other embodiments, the sealing bag may not have any flange structure 231.

In this embodiment, each of the fluid convey joint 200A and 200B includes the first pressure sensor 240 and the second pressure sensor 260, but the disclosure is not limited thereto; in some other embodiments, each the fluid convey joint may not include the second pressure sensor or may not include the first pressure sensor and the second pressure sensor.

Refers to FIGS. 5 and 6, where FIG. 6 is a cross-sectional view of the automatic fluid replacement device 10 and the storage barrel 20 in FIG. 5 when the sealing bag 230 of the fluid convey joint 200A is inflated. As shown in FIG. 5, the fluid convey joint 200B is installed into and seals one of the openings 22 of the storage barrel 20 via the robotic arm or another means. The fluid convey joint 200A is moved into the other opening 22 of the storage barrel 20 along a direction A via the robotic arm 100 (as shown in FIG. 1). As shown in FIG. 5, the sealing bag 230 of the fluid convey joint 200A is not inflated, and the outer diameter of the fluid convey joint 200A is smaller than the diameter of the opening 22, such that the fluid convey joint 200A can be easily moved into the opening 22 of the storage barrel 20. Then, as shown in FIG. 6, the controller 280 controls the external inflator (not shown) to inflate the sealing bag 230 through the inflation pipe 250 and the inflation channel G, such that the sealing bag 230 expands outwardly along a direction E and seals the opening 22 of the storage barrel 20. During the inflation of the sealing bag 230, the first pressure sensor 240 and the second pressure sensor 260 respectively measure the air pressure inside the sealing bag 230 and the air pressure inside the storage barrel 20 during the process, and the controller 280 determines the air inflation amount of the sealing bag 230 according to the air pressure inside the sealing bag 230 and the air pressure inside the storage barrel 20, and thus the flange structure 231 of the sealing bag 230 is ensured to be firmly engaged with the inner surface of the storage barrel 20.

As shown in FIG. 6, after the fluid convey joints 200A and 200B respectively seal the openings 22 of the storage barrel 20, the external gas inflation device can fill the gas (e.g., nitrogen) into the storage space S of the storage barrel 20 sequentially through the fluid pipe 270 and the convey pipe 210 along a direction B, and the external liquid extraction device can extract the chemical liquid out of the storage space S of the storage barrel 20 sequentially through the delivery pipe 210 and the fluid pipe 270 along a direction C.

It can be understood that, during the installations of the fluid convey joints 200A and 200B and the fluid replacement in the storage barrel 20, the robotic arm 100 and the controller 280 operate automatically without being operated by a person.

According to the automatic fluid replacement device and the fluid convey joint as discussed in the above embodiment, since the automatic fluid replacement device is equipped with the robotic arm, the controller, and the expandable and deformable sealing bag, during the installation of the fluid convey joint and the fluid replacement in the storage barrel, the robotic arm and the controller operate automatically.

In addition, since the sealing bag has a flange structure, the flange structure can be firmly engaged with the inner surface of the storage barrel when the sealing bag is fully inflated.

Moreover, the fluid convey joint may be equipped with the first pressure sensor and the second pressure sensor for measuring the air pressure inside the sealing bag and the air pressure inside the storage barrel at all time, and the controller determines the air inflation amount of the sealing bag according to the air pressure inside the sealing bag and the air pressure inside the storage barrel, and thus the flange structure of the sealing bag is ensured to be firmly engaged with the inner surface of the storage barrel.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An automatic fluid replacement device, adapted to be mounted on an opening of a storage barrel, comprising:
   a robotic arm, having a gripper;
   at least one fluid convey joint, comprising:
   a convey pipe, configured to deliver a fluid;
   a sleeve, sleeved on the convey pipe, wherein the gripper clamps the sleeve; and
   a sealing bag, sleeved on the sleeve; and
   a controller, configured for automatically controlling the robotic arm to move the fluid convey joint into the opening and controlling the sealing bag to be inflated to seal the opening;
   wherein the sealing bag has a flange structure; when the opening is sealed by the sealing bag, the flange structure is engaged with an inner surface of the storage barrel.

2. The automatic fluid replacement device according to claim 1, wherein the fluid convey joint further comprises a first pressure sensor, the first pressure sensor is configured to measure an air pressure inside the sealing bag, and the controller is configured to control an air inflation amount of the sealing bag according to the air pressure inside the sealing bag.

3. The automatic fluid replacement device according to claim 2, wherein the fluid convey joint further comprises an inflation pipe, the sleeve has an inflation channel, the inflation channel is in fluid communication with the sealing bag, the inflation pipe is connected to the sleeve and in fluid communication with the sealing bag through the inflation channel, and the first pressure sensor is disposed on the inflation pipe.

4. The automatic fluid replacement device according to claim 2, wherein the fluid convey joint further comprises a second pressure sensor, the second pressure sensor is configured to measure an air pressure inside the storage barrel, and the controller is configured to control the air inflation amount of the sealing bag according to the air pressure inside the storage barrel and the air pressure inside the sealing bag.

5. The automatic fluid replacement device according to claim 4, wherein the fluid convey joint further comprises a fluid pipe, the fluid pipe is connected to the sleeve and in fluid communication with the convey pipe, and the second pressure sensor is disposed on the fluid pipe.

6. The automatic fluid replacement device according to claim 1, wherein the sleeve comprises a clamped portion and a mount portion connected to each other, the clamped portion is configured to be clamped by the gripper of the robotic arm, and the sealing bag is sleeved on the mount portion of the sleeve.

7. A fluid convey joint, adapted to be mounted at an opening of a storage barrel, comprising:
   a convey pipe, configured to deliver a fluid;
   a sleeve, sleeved on the convey pipe;
   a sealing bag, sleeved on the sleeve; and
   a first pressure sensor, configured to measure an air pressure inside the sealing bag;
   wherein the sealing bag has a flange structure; when the opening is sealed by the sealing bag, the flange structure is engaged with an inner surface of the storage barrel.

8. The fluid convey joint according to claim 7, wherein the fluid convey joint further comprises an inflation pipe, the sleeve has an inflation channel, the inflation channel is in fluid communication with the sealing bag, the inflation pipe is connected to the sleeve and in fluid communication with the sealing bag through the inflation channel, and the first pressure sensor is disposed on the inflation pipe.

9. The fluid convey joint according to claim 7, wherein the fluid convey joint further comprises a second pressure sensor, and the second pressure sensor is configured to measure an air pressure inside the storage barrel.

10. The fluid convey joint according to claim 9, wherein the fluid convey joint further comprises a fluid pipe, the fluid pipe is connected to the sleeve and in fluid communication with the convey pipe, and the second pressure sensor is disposed on the fluid pipe.

11. The fluid convey joint according to claim 7, wherein the sleeve comprises a clamped portion and a mount portion connected to each other, the clamped portion is configured to be clamped by a gripper of a robotic arm, and the sealing bag is sleeved on the mount portion of the sleeve.

\* \* \* \* \*